(12) United States Patent
Goldbaum (10) Patent No.: US 8,382,415 B1
(45) Date of Patent: Feb. 26, 2013

(54) RAPID-ENGAGING AND POSITIVE-LOCKING THREADED CONFIGURATION

(76) Inventor: Harold Goldbaum, Vero Beach, FL (US)

(*) Notice: Subject to any disclaimer, the term of this patent is extended or adjusted under 35 U.S.C. 154(b) by 119 days.

(21) Appl. No.: 12/728,223

(22) Filed: Mar. 21, 2010

Related U.S. Application Data (63) Continuation-in-part of application No. 11/515,693, filed on Sep. 5, 2006, now Pat. No. 7,682,120.

(51) Int. Cl.
*F16B 21/00* (2006.01)

(52) U.S. Cl. ............ 411/551; 411/366.1; 411/383; 411/411; 411/432; 411/436; 411/437

(58) Field of Classification Search .......... 411/91, 411/98, 106, 110, 114, 118, 119, 124, 143, 411/167, 187, 204, 214, 308–310, 329, 347, 411/366.1, 383, 411, 417, 418, 424, 432, 411/436, 437, 549, 551, 553, 929, 932, 195, 411/196, 208, 217, 221, 925–926, 933, 940, 411/959; 606/99
See application file for complete search history.

(56) References Cited

U.S. PATENT DOCUMENTS

| | | | |
|---|---|---|---|
| 172,387 A | | 1/1876 | Cazin |
| 503,195 A | | 8/1893 | Clark et al. |
| 529,633 A | * | 11/1894 | Stevens ............ 411/114 |
| 763,210 A | * | 6/1904 | Schwamberger et al. .... 285/355 |
| 827,198 A | | 7/1906 | Watts |
| 829,407 A | * | 8/1906 | Long ............ 411/329 |
| 899,080 A | | 9/1908 | Stark |
| 949,412 A | * | 2/1910 | Betz ............ 411/228 |
| 1,064,546 A | | 6/1913 | Ryan |
| 1,250,748 A | | 12/1917 | Woodward |
| 1,275,478 A | | 8/1918 | Ryan |
| 1,451,970 A | | 4/1923 | Taylor |
| 1,946,860 A | | 2/1934 | Kielland |
| 2,517,364 A | | 8/1950 | Torresen |
| 2,521,257 A | | 9/1950 | Sample |
| 2,730,154 A | * | 1/1956 | Aspey ............ 411/321 |
| 2,828,662 A | | 4/1958 | Antal |
| 2,991,695 A | * | 7/1961 | Jones ............ 351/141 |
| 3,310,191 A | * | 3/1967 | Kern et al. ............ 215/252 |
| 3,474,846 A | | 10/1969 | Bien |
| 4,712,957 A | * | 12/1987 | Edwards et al. ............ 411/82.1 |

(Continued)

FOREIGN PATENT DOCUMENTS

| EP | 1663354 | 6/2006 |
|---|---|---|
| JP | 113827 | 9/1989 |

(Continued)

*Primary Examiner* — Roberta Delisle
(74) *Attorney, Agent, or Firm* — Allen D. Hertz, P.A.; Allen D. Hertz

(57) ABSTRACT

A rapid-engaging, positive locking machine screw mechanism comprises a screw having a head and a body wherein the body includes male threads formed thereon wherein the threaded body has at least one longitudinal segment devoid of threads. A work piece defines a hole having female threads formed therein for receiving the screw and further defines in a portion of the hole, at least one longitudinally extending segment devoid of female threads. The longitudinal screw segment devoid of male threads and the longitudinal hole segment devoid of female threads are arranged such that the screw body is longitudinally received in the hole without engagement of the male screw threads with the female work piece threads. The rapid-engaging, positive locking thread configuration can be applied to a variety of mechanical interfaces. Additionally, thread locking configurations, such as a boos-depression interface, a notch and ridge, etc. can be incorporated to secure the male and female threads.

7 Claims, 12 Drawing Sheets

U.S. PATENT DOCUMENTS

| | | | |
|---|---|---|---|
| 4,781,507 A | 11/1988 | Duenas | |
| 4,880,343 A * | 11/1989 | Matsumoto | 411/222 |
| 5,106,251 A | 4/1992 | Steinbach | |
| 5,238,342 A | 8/1993 | Stencel | |
| 5,324,297 A | 6/1994 | Hood et al. | |
| 5,382,251 A | 1/1995 | Hood et al. | |
| 5,460,468 A | 10/1995 | DiStacio | |
| 5,713,708 A | 2/1998 | VanderDrift et al. | |
| 6,045,188 A | 4/2000 | Schooler | |
| 6,119,306 A | 9/2000 | Antonucci et al. | |
| 6,905,297 B2 | 6/2005 | DiStasio et al. | |
| 6,908,271 B2 | 6/2005 | Breslin et al. | |
| 7,090,454 B2 | 8/2006 | Shain | |
| 7,726,924 B2 * | 6/2010 | Lu | 411/171 |

FOREIGN PATENT DOCUMENTS

| | | |
|---|---|---|
| JP | 2005344751 | 12/2005 |
| JP | 2005344772 | 12/2005 |
| WO | WO-9601379 | 1/1996 |
| WO | WO-9826325 | 6/1998 |
| WO | WO-03001068 | 1/2003 |

* cited by examiner

RAPID-ENGAGING AND POSITIVE-LOCKING THREADED CONFIGURATION

CROSS REFERENCE TO RELATED APPLICATIONS

This application is a Continuation In Part of application Ser. No. 11/515,693 filed Sep. 5, 2006, issuing as U.S. Pat. No. 7,682,120 on Mar. 23, 2010, which is incorporated in its entirety herein by reference.

FIELD OF THE INVENTION

The present invention relates to mechanical fastening systems and more particularly to rapid engaging, locking machine screw mechanisms.

BACKGROUND OF THE INVENTION

Threaded fasteners are one of the most common mechanical fastening systems in use today. While bolts and nuts are typically the primary threaded fasteners, screws are just as common and important in the construction of mechanisms consumers use in multitudes of ways every day. A screw is used when, instead of a work piece being clamped between a nut and the head of the fastener, a portion of the work piece is internally threaded and the screw is torqued into the work piece itself. As with all threaded fasteners, screws torqued into engagement with an internally threaded work piece are subject to loosening over time and, as with threaded nuts and bolts, numerous devices have been incorporated to prevent such loosening. In other applications of screws being torqued into a work piece, vibration or dilation will also cause the screw to loosen over time. Often these screws are located in areas that are difficult to access, or may even be totally inaccessible to being re-tightened.

In the particular case of eyeglasses, the screws securing the temples and lenses often loosen, followed by the undesired consequence of a temple falling off or a lens falling out. The causes of such loosening in eyewear are varied. The repeated opening and closing of the temples by rotating the temple about the screw retaining it to the frame of the glasses will induce rotational loosening. Thermal gradients in the environment have a more pronounced effect on the female thread in which the screw is received than on the male threaded screw thus resulting in additional loosening forces.

In other applications of screws being torqued into a work piece, vibration or dilation will also cause the screw to loosen over time. Often these screws are located in areas that are difficult to access, or may even be totally inaccessible to being retightened.

Prior attempts to overcome these loosening forces have included the addition of a smaller setscrew, or locking screw, that is threaded through the side of the work piece into interfering perpendicular contact with the threads of the screw. However, a locking screw is subject to the same loosening forces as the primary screw and can be difficult and expensive to install. Additionally, in the case when the primary screw is relatively small, adding a setscrew becomes impractical. Various types of liquid metal on metal glues have been utilized, but over time the effectiveness of these substances is questionable. Lock washers also have mixed success results.

Other attempts to prevent loosening have included the use of lock washers, but these generally provide unsatisfactory results in situations of considerable vibration. Castellated nuts and cotter pins inserted through holes drilled in the bolt, have also been utilized to prevent loosening of the nut, and are generally successful in so doing, but the cost of installation is high and labor intensive. Screw and nut ensembles having movable locking assemblies have also been used; while they are generally effective, their cost is high.

Further, a problem encountered with machine screws not typically found with regular nuts and bolts is that a machine screw will often engage a greater number of threads in the work piece than in a standard nut of the same size or, in other cases, will require a screw of a significant threaded length necessitating numerous revolutions of the threads to reach a final torqued position. Mechanical locking systems incorporating deformed threads to interferingly lock the fastener in place become disadvantageous in these circumstances. With long threaded fasteners or numerous internal threads engaged by the fastener, the significant number of turns required to finally torque the fastener will either totally defeat the deformation feature by the time final torquing is accomplished or the extended sustained torquing force applied to the fastener head will often damage the head making a final torquing impossible and requiring an undesired replacement.

In the case of container having a closure consisting of a threaded collar and cap and containing carbonated or other beverages, pressure may build up in the container, and the container may also be subject to rough usage; thus a rather long collar and cap thread is required to assure engagement of a significant number of cooperating threads, to assure that the cap is well secured on the container collar; thus, many revolutions of the cap are required to reseal the container. Often, however, users simply neglect to "tighten" the cap to full closure to reseal the container properly or, even if the cap had been tightly screwed onto the collar, it may loosen—resulting in a container losing carbonation and/or leaking its contents, with the attendant consequences. A definite consumer advantage would accrue if the container cap could come to a secure full-closure position rapidly, without a significant number of revolutions, and be prevented from loosening from that position.

There are many types of pipe and tube fittings, the principal one among them being threaded fittings. Such fittings are required to maintain in a fully torqued position at least two elements of a piped or tubing assembly. Speed of assembly of such threaded fittings to a fully torqued position is always an issue and, often, such fittings and assemblies are subject to vibrational stresses, which cause a fitting to loosen, and the transported material to leak thereat. A definite industrial advantage would accrue if the tubes' or pipes' threaded fitting elements could come to a secure fully-torqued position rapidly, without a significant number of revolutions, and be prevented from loosening from that position.

Thread engagement must be discussed when discussing threaded locking fasteners. It is well known that manufacturing variations in common nuts and bolts create an ensemble wherein only relatively few threads of a common nut threaded on a common bolt are in effective mutual engagement. Obviously, the locking features of the device disclosed herein would be vitiated if most, if not all, of the threads of the male and female parts herein disclosed were not in effective engagement. It is therefore preferable that the screw and female receiver disclosed herein be manufactured to specifications adequate to assure effective engagement of their threads, as a set. Obviously, in the case of a threaded container closure, that is always the situation. In the case of tube or pipe fittings and assemblies, especially where the transported material is critical, no leakage is desired, such that the male threaded part and the female receiver disclosed herein be manufactured to specifications adequate to assure effective engagement of their threads, as a set.

Thread pitch is also a consideration to be weighed in applications using the configuration disclosed herein. It is obvious that, the higher the thread pitch of the configuration, the more rapid is the clamping action provided by the ensemble. The choice of thread pitch has no influence on the efficacy of the configurations disclosed herein.

Thus, what is desired is a mechanism for quickly positioning and locking screws torqued into a threaded hole in a work piece and wherein the mechanism will reliably maintain the desired engagement of the screw in the receiving hole throughout the life of the apparatus on which it is installed.

SUMMARY OF THE INVENTION

One aspect of the present invention is a rapid-engaging, positive locking machine screw mechanism. The mechanism comprises a screw having a head and a body wherein the body includes male threads formed thereon and further wherein the threaded body has at least one longitudinal segment devoid of threads. A work piece defines a hole having female threads formed therein for receiving the screw and further defines in a portion of the hole, at least one longitudinally extending segment devoid of female threads. The longitudinal screw segment devoid of male threads and the longitudinal segment in the work piece devoid of female threads are arranged such that the screw body is longitudinally received in the hole without engagement of the male screw threads with the female work piece threads.

Another aspect of the present invention is a rapid engaging, positive locking machine screw mechanism comprising a screw having a head and a body including male threads formed thereon. The threaded body defines a number of circumferentially spaced longitudinally extending body segments therearound. Alternating ones of the body segments are devoid of threads and define thereon a partial outer cylindrical surface. A work piece defines a hole having female threads formed therein for receiving the screw. The threaded hole further defines a like number of longitudinally extending hole segments wherein alternating ones of the hole segments are devoid of threads and define a partial inner cylindrical surface on an inside of the hole. The longitudinal screw body segments devoid of male threads and the longitudinal segments in the work piece hole devoid of female threads are arranged such that the screw body is longitudinally received in the hole without engagement of the male screw threads with the female work piece threads.

Another aspect of the present invention is a rapid-engaging, positive locking nut or other female threaded part, defining a body having a threaded hole therein, having female threads formed therearound for receiving a bolt or other male threaded part. The threads define a number of circumferentially spaced longitudinally extending body segments therearound. Alternating ones of the body segments are devoid of threads and define thereon a partial outer cylindrical surface. The threaded hole further defines a like number of longitudinally extending hole segments wherein alternating ones of the hole segments are devoid of threads and define a partial inner cylindrical surface on an inside of the hole. The longitudinal segments devoid of female threads are arranged such that the screw body is longitudinally received in the hole without engagement of the male screw threads with the female threads.

Another aspect of the present invention is a rapid-engaging, positive-locking container cap, defining a body having a cavity generally having female threads formed therearound for receiving the male threaded part on the outside of a container opening. The threads of the cavity define a number of circumferentially spaced longitudinally extending body segments therearound. Alternating ones of the body segments are devoid of threads and define thereon a partial outer cylindrical surface. The male threads on the outside of the container opening define a like number of longitudinally extending threaded body segments wherein alternating ones of the body segments are devoid of threads and define a partial outer cylindrical surface on an outside of the male-threaded container opening. The longitudinal segments of the bottle cap devoid of female threads are arranged such that the container cap is longitudinally received by the male threads on the outside of the container opening without engagement of the said male threads with the female threads of the container cap.

Another aspect of the present invention are rapid-engaging, positive-locking tube or pipe fittings, firstly defining a female element with a cavity generally having female threads formed therearound for receiving the male threaded part on the outside of a tube or pipe opening. The threads of the cavity define a number of circumferentially spaced longitudinally extending body segments therearound. Alternating ones of the body segments are devoid of threads and define thereon a partial outer cylindrical surface. Secondly, the male threads on the outside of the tube or pipe opening define a like number of longitudinally extending threaded body segments wherein alternating ones of the body segments are devoid of threads and define a partial outer cylindrical surface on an outside of the male-threaded tube or container opening. The longitudinal segments of the female element's cavity devoid of female threads are arranged such that the cavity of the female elements is longitudinally received by the male threads on the outside of the tube's or pipe's opening without engagement of the said male threads with the female threads of the female element.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE PREFERRED EMBODIMENT

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
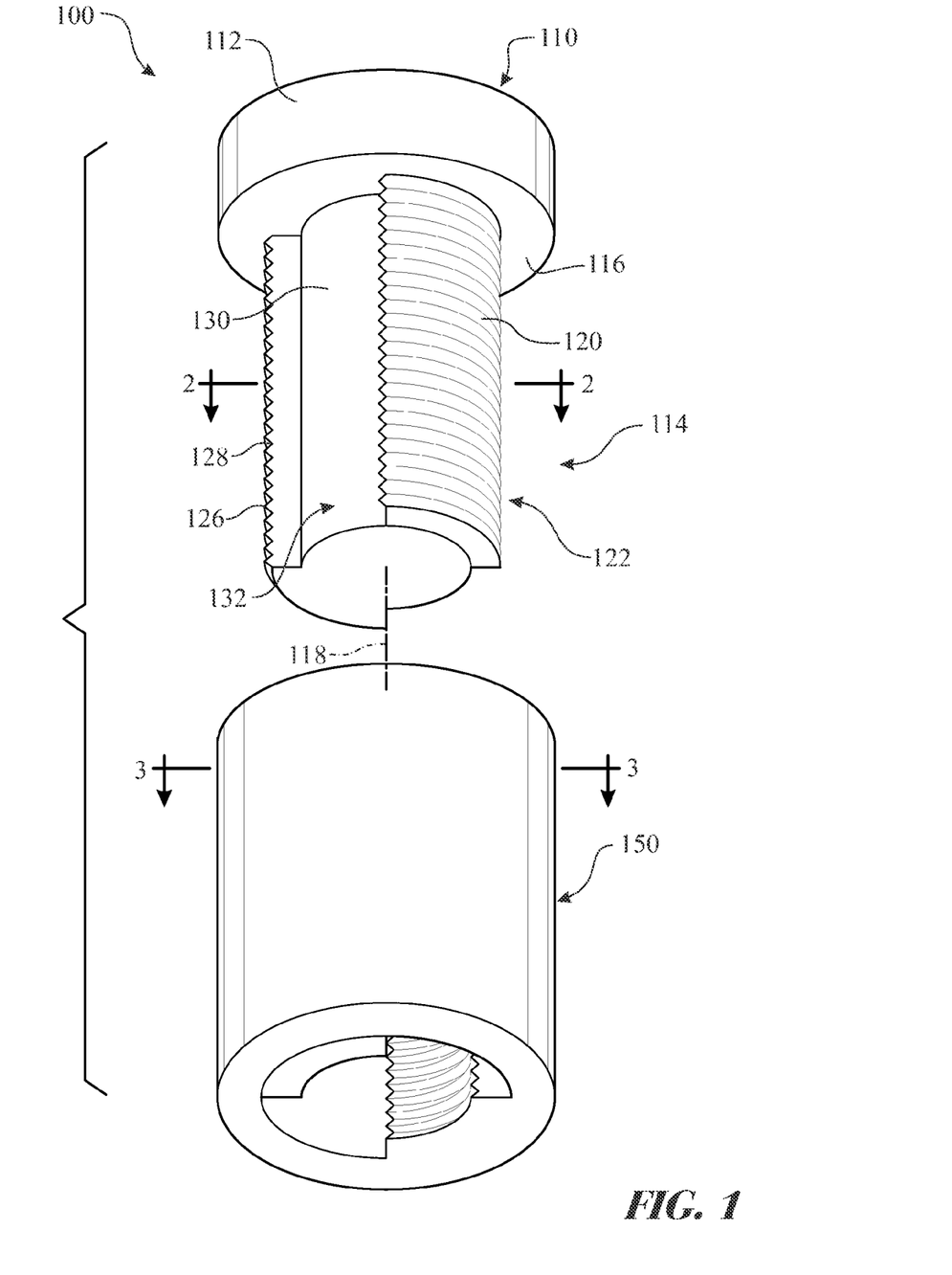
FIG. 1 is an exploded view of a positive locking machine screw mechanism embodying the present invention, illustrated with an internally threaded work piece for receiving a screw.

Turning to the drawings, FIG. 1 shows a positive locking machine screw mechanism 100, which is one of the preferred embodiments of the present invention and illustrates its various components. Locking machine screw mechanism 100 includes a machine screw 110 for threaded engagement in a work piece 150 for the purpose of securing a third article (not shown) to the work piece 150.

Figure 3:
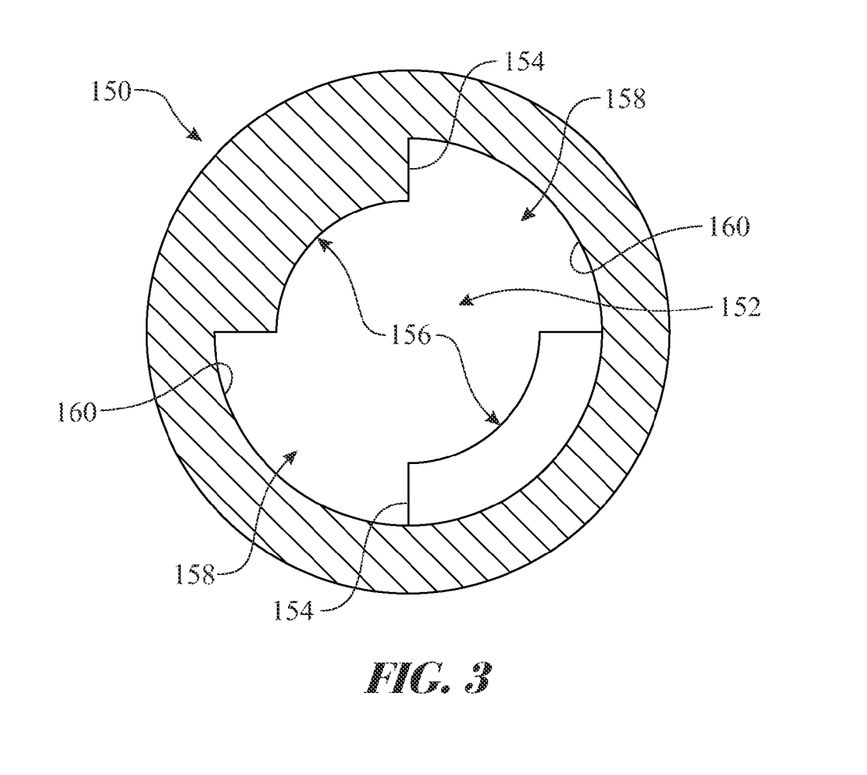
FIG. 3 is a cross-sectional plan view of the threaded work piece shown in FIG. 2 and taken along section line 3-3, FIG. 2.

The machine screw 110 has a head 112 and a body 114 extending from a bottom surface 116 of head 112, as illustrated in FIGS. 1 and 3. Body 114 is divided into a number of longitudinal segments 122, 132 wherein segments 122 include male threads 120 formed thereon and wherein segments 132 are void of threads. Threaded segments 122 are threaded as though male threads 120 extend an entire periphery of screw body 114 such that screw 110 can be threaded into a correspondingly threaded hole without a mismatch of threads from one segment to another. Male threads 120 have a major diameter corresponding to a diameter defined by male thread tops (crests) 126 and a minor diameter corresponding to a diameter defined by male thread bottoms (roots) 128. Void segments 132 are devoid of threads and have a cylindrically shaped surface 130. Cylindrically shaped surfaces 130 and male threads 120 have a common central axis 118, which is the longitudinal axis of machine screw 110.

A machine screw having two threaded segments 122 and two void segments 132 extending an entire length of screw body 114 are illustrated in FIGS. 1 and 3, those skilled in the art will readily understand that other numbered combinations of longitudinal segments 122, 132 are possible and are anticipated herein such as three threaded segments 122 and three void segments 132. Further, as is well known in the art, machine screw 110 can also have a body 114 wherein only a lower portion thereof has threads 120 formed thereon. However, that portion of body 114 so threaded will, according to the above description, be divided into threaded segments 122 and void segments 132.

Figure 5:
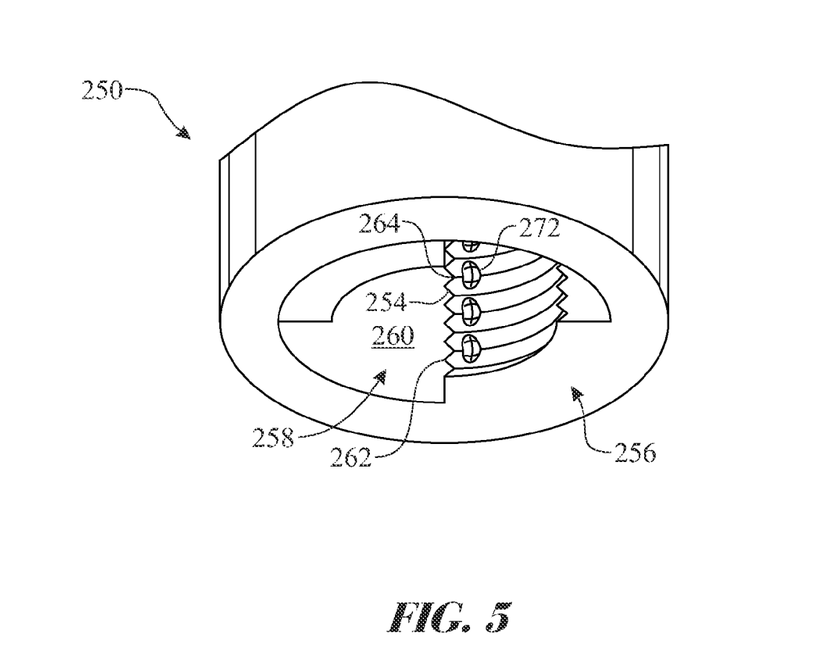
FIG. 5 is an isometric partial elevation view of the threaded work piece of FIG. 1 illustrating an optional locking feature corresponding to FIG. 4.

A portion of a general work piece 150 is illustrated defining a hole 152 therein for receiving machine screw 110 as shown in FIGS. 1, 3, and 5. Work piece 150 can be a general piece of structure into which machine screw 110 is to be received or a nut to be affixed to machine screw 110 for clamping other pieces therebetween. As with machine screw 110, hole 152 is divided into a number of longitudinal segments 156, 158 wherein segments 156 have female threads 154 formed therein and segments 160 are void of female threads. The number of segments 156, 158 corresponds to a like number of segments 122, 132 on screw body 114. Female threaded segments 156 define female threads 154 formed therein generally corresponding to male threads 120 on screw body 114. Female threads 154 have a minor diameter corresponding to a diameter defined by female thread tops (crests) 162 and a major diameter corresponding to a diameter defined by female thread bottoms (roots) 164. Void female segments 158 define a cylindrical surface 160 wherein cylindrically shaped surfaces 160 and female threads 154 also have common central axis 118.

Figure 2:
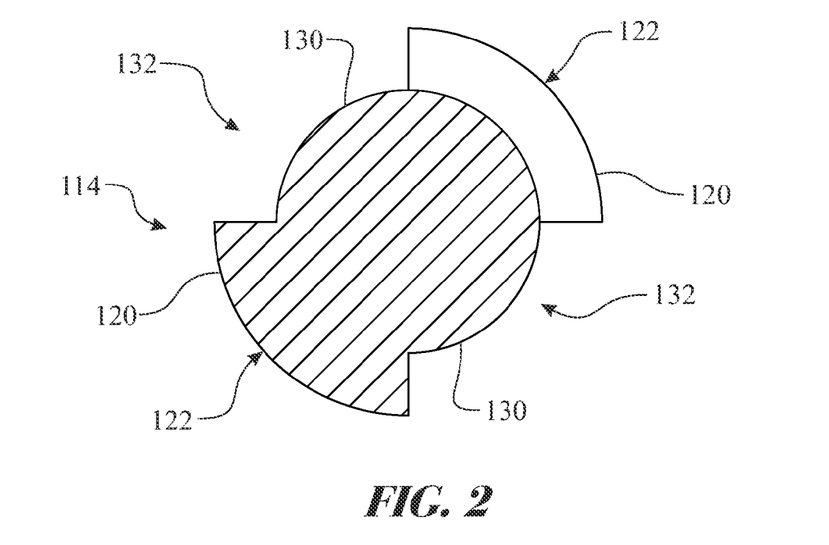
FIG. 2 is a cross-sectional plan view of the screw shown in FIG. 1 and taken along the line 2-2, FIG. 1.

Segments 122, 132 of machine screw 110 are shown having a nominal angular width of ninety degrees is illustrated in FIGS. 1 through 3. Correspondingly, segments 156, 158 in hole 152 also have nominal angular widths of ninety degrees. Initial insertion of machine screw 110 in hole 152 is accomplished by aligning male threaded segments 122 of screw 110 with void female segments 158 defined by hole 152. Machine screw 110 is then translated along axis 118 until screw body 114 is inserted to its desired position within hole 152. To accomplish this insertion in an unobstructed manner, those practiced in the art will recognize that the angular width of void segments 132 and 158 will be formed to have an actual angular width marginally greater than threaded segments 156 and 122 respectively. Further, the diameter of cylindrical surface 160 defined by void segments 158 in hole 152 will be formed marginally greater than the major diameter of male threads 120 as defined by thread tops (crests) 126. Similarly, the diameter of cylindrical surface 130 of void segments 132 about screw body 114 will be formed marginally smaller than the minor diameter of female threads 154 as defined by thread tops (crests) 162.

While the angular width of male threaded segments 122 are shown in a preferred embodiment to be nominally equal to the angular width of female threaded segments 156, the disclosure herein also contemplates alternative embodiments where male threaded segments 122 and female threaded segments have differing angular widths.

Upon insertion of screw body 114 in hole 152, engagement of machine screw 110 within hole 152 requires torquing screw 110 only a partial turn with respect to hole 152. The angular rotation required for full engagement of male threads 120 with female threads 154 in the illustrated embodiment is ninety degrees. However, those practiced in the art will recognize that other angular configurations of threaded segments 122 and 156 will require other minimum angular rotations to effect full thread engagement.

Locking of machine screw 110 within hole 152 occurs as the male threads 120 and female threads 154 as the assembly reaches terminal engagement. The male width of individual male threads 120 of male threaded segments 122 are marginally wider than the female width of female threads 154 thereby creating an interference fit of male threads 120 within female threads 154 of female threaded segments 156. Additionally, the major diameter of male threads 120 as defined by thread tops (crests) 126 is marginally greater than the major diameter of female threads 154 as defined by thread bottoms (roots) 164. Alternatively, the minor diameter of male threads 120 as defined by thread bottoms (roots) 128 can be marginally smaller than the minor diameter of female threads 154 as defined by thread tops (crests) 162. The interference fit of male threads 120 within female threads 154 becomes advantageous since screw 110, as a result of its longitudinal insertion capability, does not require multiple rotations to become fully engaged. To facilitate the interference fit of male threads 120 in female threads 154, screw 110 can be manufactured from a material having greater malleability characteristics than work piece 150.

Figure 4:
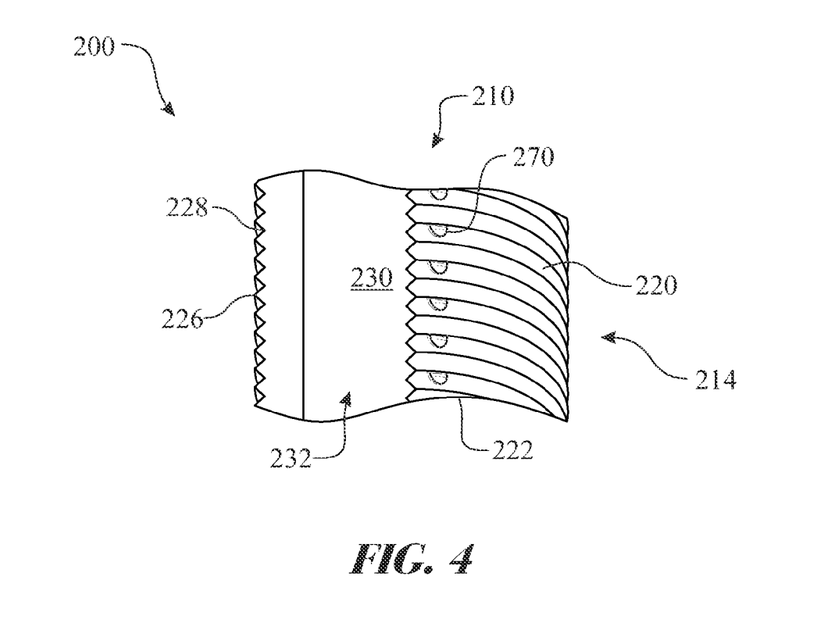
FIG. 4 is an enlarged partial elevational view of the threaded screw shaft showing an optional locking feature.

An optional locking feature is illustrated wherein male threaded segments 222 of screw 210 include bosses 270 protruding from individual ones of male threads 220 are illustrated in FIGS. 4 and 5. Like features of rapid engaging, emboss locking threaded interface 200 and positive locking machine screw mechanism 100 are numbered the same except preceded by the numeral '2'. Individual ones of female threads 254 of female threaded segments 256 in hole 252 define depressions 272 radially placed to correspond to the placement of bosses 270 such that upon full engagement of male threads 220 in female threads 254, bosses 270 are received and seated within depressions 272.

Figure 6:
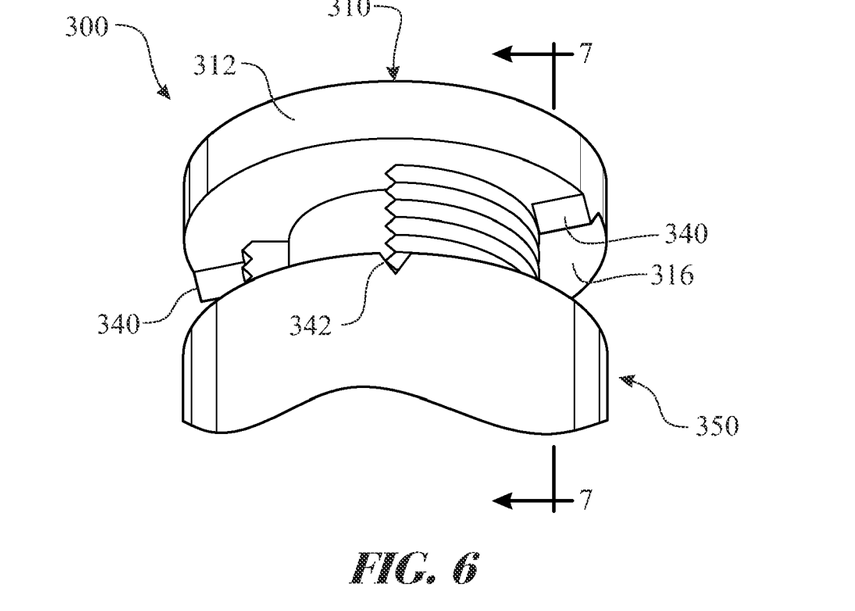
FIG. 6 is an isometric view of the screw and mating work piece of FIG. 1 incorporating a locking feature on the screw head.
Figure 7:
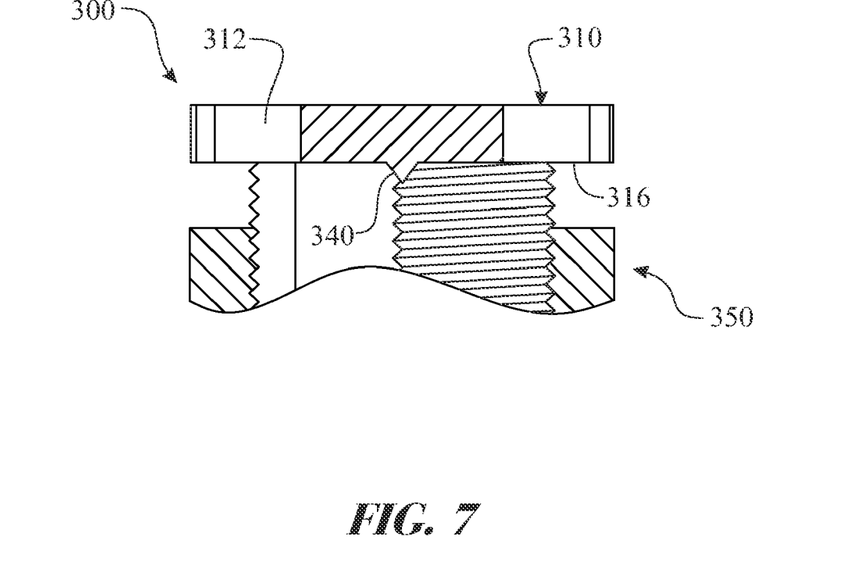
FIG. 7 is a cross-sectional elevation view of the screw and work piece of FIG. 6 taken along section 7-7.

Another optional locking feature is shown in FIGS. 6 and 7. The illustrated locking feature includes at least one locking bar 340 protruding downwardly from the bottom surface 316 of screw head 312 and extending radially from central axis 118 (FIG. 1). Like features of rapid engaging, tab locking threaded interface 300 and positive locking machine screw mechanism 100 are numbered the same except preceded by the numeral '3'. Work piece 350 includes a radial groove proximate to hole 352 and positioned such that upon full engagement of male threads 320 with female threads 354 and as bottom surface 316 bears upon work piece 350, locking bar 340 interferingly bears upon work piece 350 until locking bar 340 is aligned with groove 342. Alignment of locking bar 340 with groove 342 results in the seating of locking bar 340 in groove 342, thus preventing undesired rotation of screw 310 as a result of various environmental factors acting to disengage screw 310 from hole 352. While FIGS. 6 and 7 illustrate a bar and groove configuration, other geometries of protrusions and recesses are contemplated.

Figure 10:
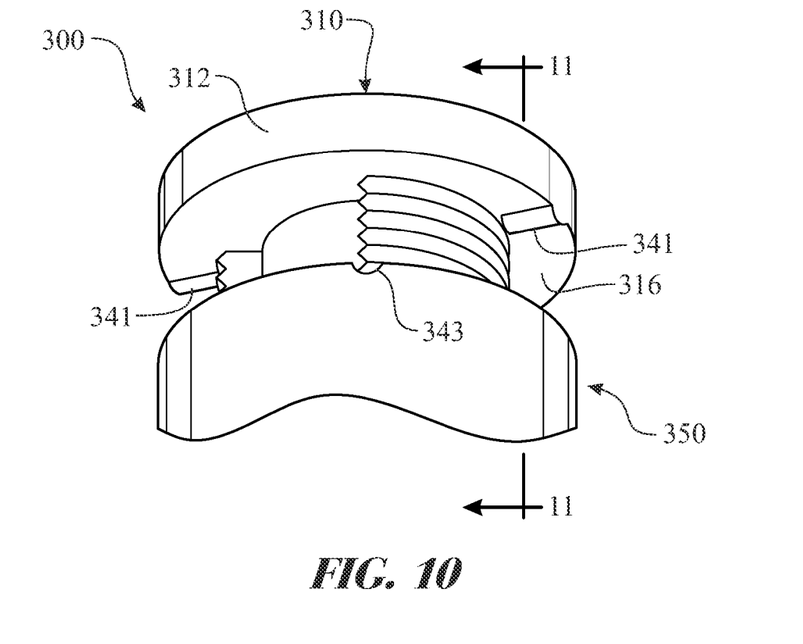
FIG. 10 is an isometric view of the screw and mating work piece of FIG. 1 incorporating an alternate locking feature on an underside of the screw head and a shoulder of the work piece.
Figure 11:
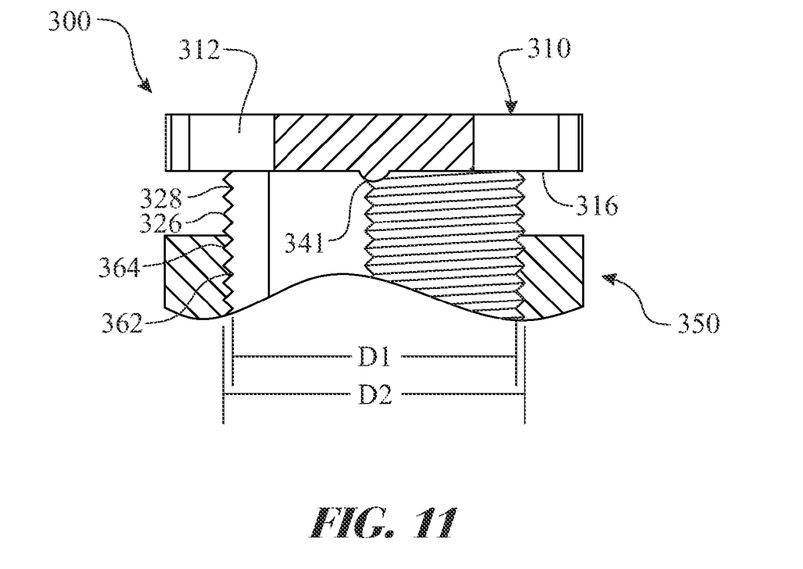
FIG. 11 is a cross-sectional elevation view of the screw and work piece of FIG. 10 taken along section 11-11.

The first optional locking feature illustrated in FIGS. 6 and 7 is shaped in a "V" notch. The second optional locking feature illustrated in FIGS. 10 and 11 is a radiused locking ridge 341 with a small radiused locking recess 343. The locations can be determined by the designer. The machine screw 310 and work piece 350 are rotated such to align the radiused locking ridge 341 with the radiused locking recess 343. The radiused locking ridge 341 engages with the radiused locking recess 343 ensuring the machine screw 310 and the work piece 350 remain in engaged registration. Although the illustration presents a pair of mating ridges locking features 341, 343, it is recognized that any number of mating ridges locking features 341, 343 can be spacially arranged about the interface between the bottom surface 316 and the mating surface of the work piece 350, 351. Further, the ridge and recess can be reversed.

The dimensions of the threads can be utilized to aid in the locking process. An exemplary thread interference condition is illustrated in FIG. 11, wherein a narrow thread diameter D1 and a broad thread diameter D2 are disclosed. The diameter across the male thread roots 328 and the female thread crests 362 are referenced as a narrow thread diameter D1. The diameter across the male thread crests 326 and the female thread roots 364 are referenced as a broad thread diameter D2. The threads can be formed such that the narrow thread diameter D1 of the male thread roots 328 is slightly greater than the diameter D1 of the female thread crests 362 and/or such that the broad thread diameter D2 of the male thread crests 326 is slightly greater than the diameter D2 of the female thread roots 364.

Figure 8:
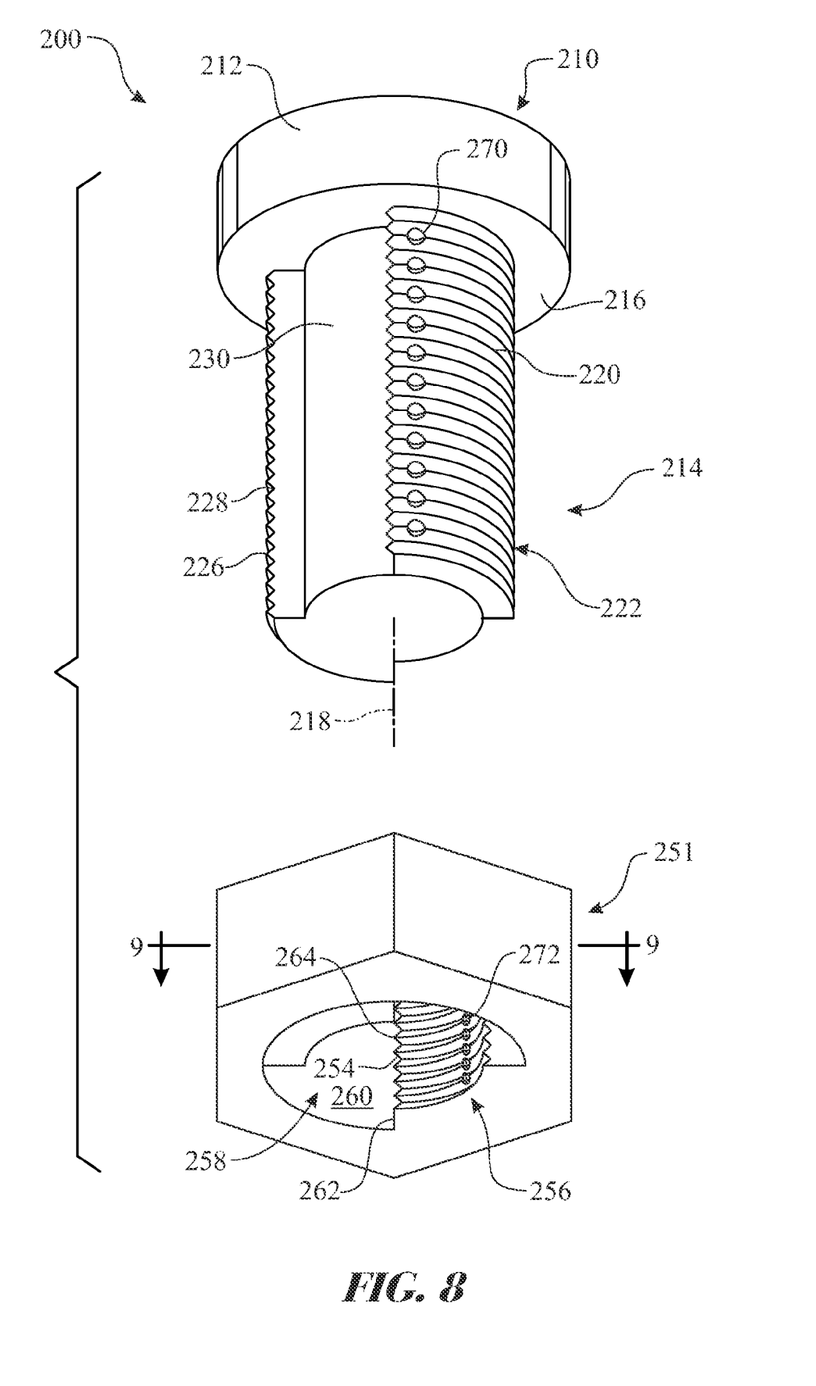
FIG. 8 is an exploded view of a positive locking machine screw fastener embodying the present invention, illustrated with a mating nut for receiving the screw fastener.
Figure 9:
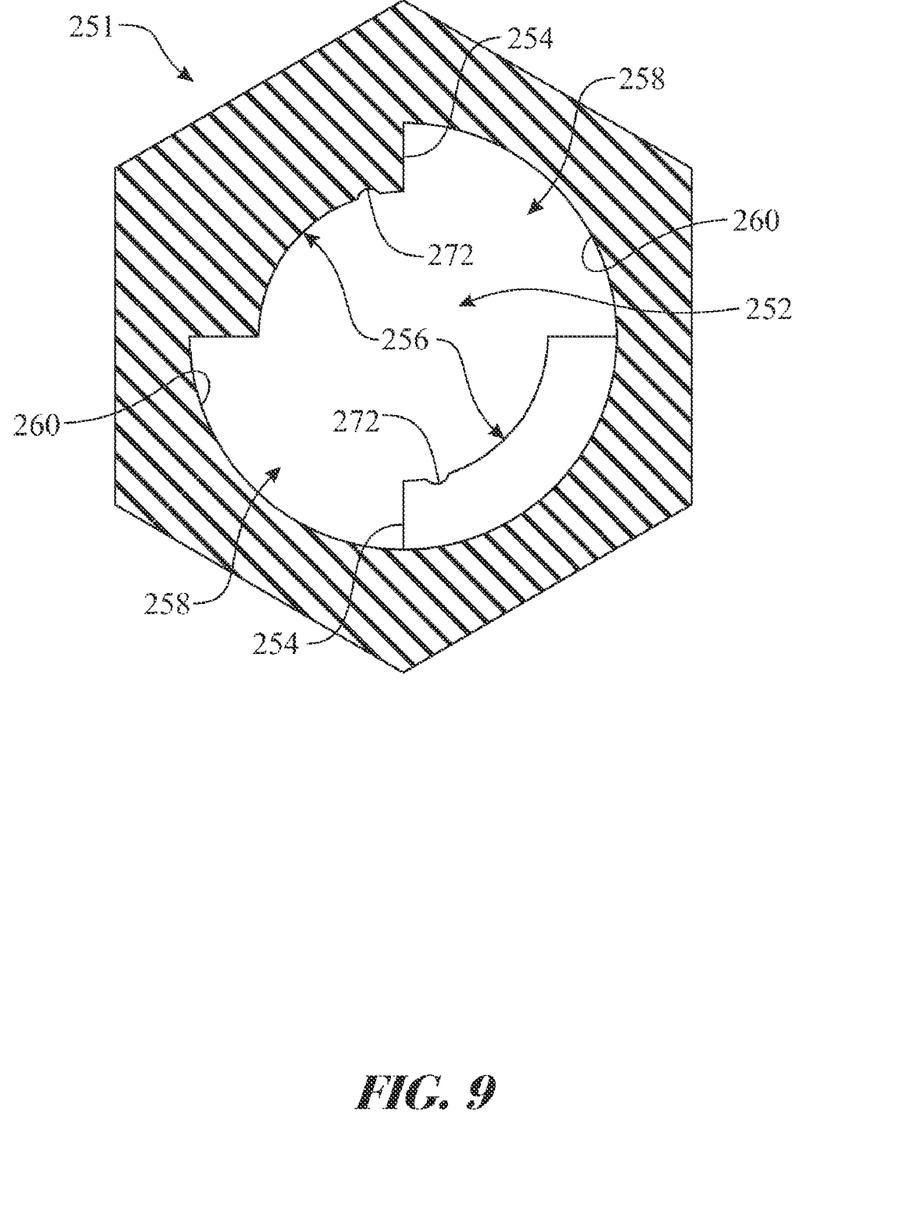
FIG. 9 is a cross-sectional plan view of the mating nut shown in FIG. 8 and taken along section line 9-9.

An alternate rapid engaging/positive locking thread configuration is referred to as a rapid engaging, emboss locking threaded interface 200, illustrated in FIGS. 8 and 9. Like features of rapid engaging, emboss locking threaded interface 200 and positive locking machine screw mechanism 100 are numbered the same except preceded by the numeral '2'. The work piece 250 is provided as a rapid engaging nut 251, being illustrated in a form factor of a hex nut. It is recognized the work piece 250 can comprise the female threading configuration in accordance with the present invention, be provided with any external form factor such as the hex nut as illustrated. Other form factors can include a square nut, a bottle cap or pipe coupling (as illustrated later herein), and the like. It is noted, the location of the series of depressions 272 can be anywhere along the length of the female threads 254. The illustration positioned the female threads 254 proximate the leading edge of the threads, thus providing a maximum length of engagement between the male threads 220 and the female threads 254. The depressions 272 are detailed in the cross-sectional view in FIG. 9. It is understood that the bosses 270 and depressions 272 can be reversed, adapting the bosses 270 on the female threaded segments 256 and the depressions 272 on the screw body 214.

Figure 12:
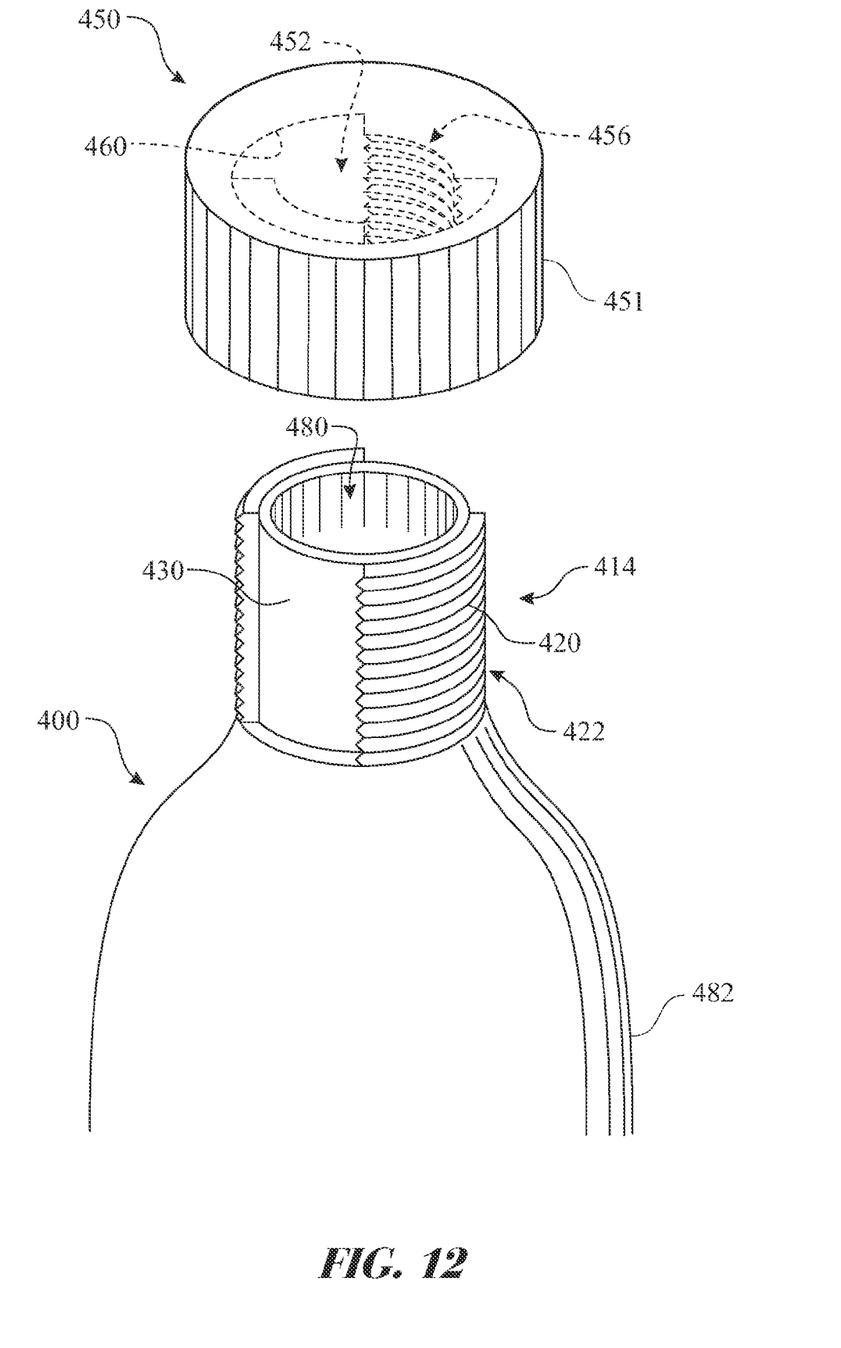
FIG. 12 is an isometric view of an exemplary bottle and bottle cap embodying the fastener configuration of the present invention.
Figure 13:
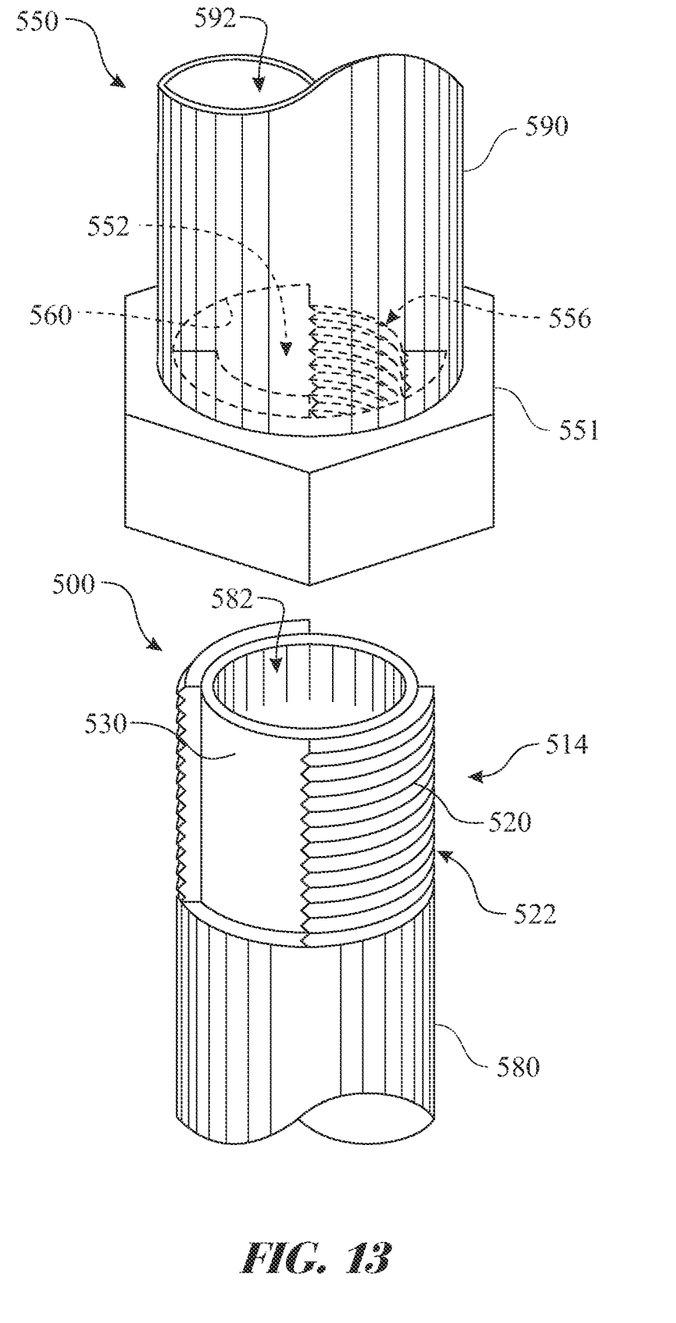
FIG. 13 is an isometric view of an exemplary pipe coupling configuration embodying the fastener configuration of the present invention.
Figure 14:
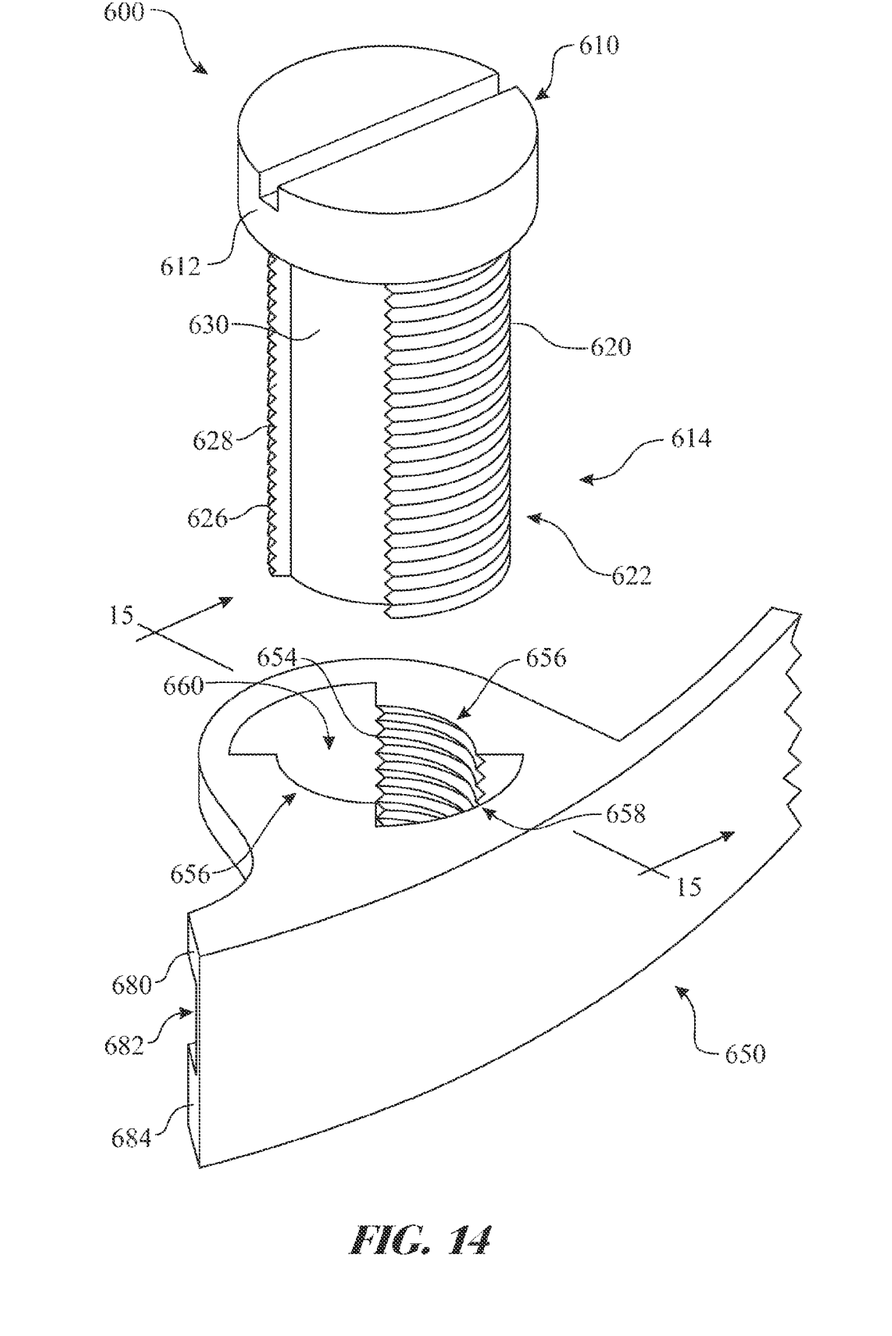
FIG. 14 is an isometric view of an exemplary eyeglass frame member embodying the fastener configuration of the present invention.
Figure 15:
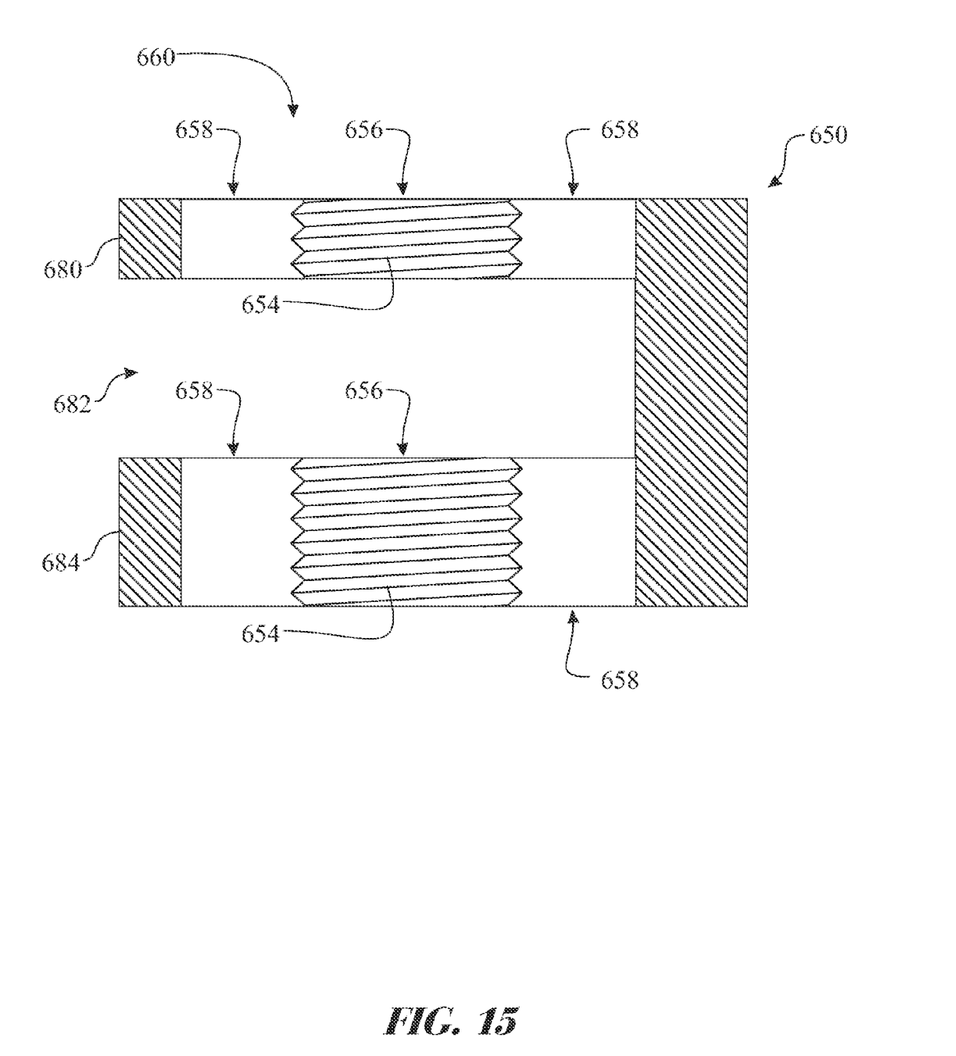
FIG. 15 is a cross-sectional elevation view of the exemplary eyeglass frame member of FIG. 14 taken along section 15-15.

The rapid engaging/positive locking thread configuration of the present invention can be adapted to a plethora of applications. Several exemplary applications are taught herein, including a bottle 400 and mating bottle cap 450 as illustrated in FIG. 12, a pipe coupling as illustrated in FIG. 13, and an eyeglass frame assembly as illustrated in FIGS. 14 and 15. The rapid engaging/positive locking thread configuration can be integrated into other applications that are not detailed, such as watch links, and the like.

A threaded bottle neck 414 of the bottle 400 comprises the male portion of the rapid engaging/positive locking thread configuration as previously taught. The bottle 400 comprises a bottle reservoir 482, accessed via a bottle opening 480. A quick fastening bottle cap 450 provides a seal to the bottle reservoir 482, by securing the quick fastening bottle cap 450 to a threaded bottle neck 414 located proximate the bottle opening 480. The quick fastening bottle cap 450 comprises the female portion of the rapid engaging/positive locking thread configuration as previously taught. Like features of bottle 400 and machine screw 110 and similarly the quick fastening bottle cap 450 and work piece 150 are numbered the same except preceded by the numeral '4'. The bottle neck receiving cavity 452 does not pass completely through the quick fastening bottle cap 450, thus providing a seal to the bottle 400 when the quick fastening bottle cap 450 is secured onto the threaded bottle neck 414. A knurled surface is preferably provided about a bottle cap sidewall 451 of the quick fastening bottle cap 450, providing support to the user when removing/securing the quick fastening bottle cap 450 from/to the bottle 400. It is understood that any of the additional locking features, such as the bosses 270 and depressions 272 or locking tab 340 and respective locking groove 342 as previously taught can be integrated into the configuration for the bottle 400 and bottle cap 450.

Similarly, a male threaded pipe member 500 is coupled to a female threaded pipe member 550 via the rapid engaging/positive locking thread configuration as previously taught. The male threaded pipe member 500 is formed having a pipe sidewall 580 with a pipe center 582 provided therethrough. A threaded end 514 is formed at one end of the male threaded pipe member 500. The threaded end 514 comprises the male portion of the rapid engaging/positive locking thread configuration as previously taught. The female threaded pipe member 550 is formed having a pipe sidewall 590 with a pipe center 592 provided therethrough. The female threaded pipe member 550 mates with the male threaded pipe member 500 via a female threaded fastening member 551. The female threaded fastening member 551 comprises the female portion of the rapid engaging/positive locking thread configuration as previously taught. Like features of male threaded pipe member 500 and machine screw 110 and similarly the female threaded pipe member 550 and work piece 150 are numbered the same except preceded by the numeral '5'. The female threaded fastening member 551 can be of any reasonable shape. It is understood that any of the additional locking features, such as the bosses 270 and depressions 272 or locking tab 340 and respective locking groove 342 as previously taught can be integrated into the configuration for the male threaded pipe member 500 and female threaded pipe member 550.

In yet another application, the rapid engaging/positive locking thread configuration is utilized for assembly of an eyeglass frame. Screws for eyeglasses are known to loosen or even separate from the frame assembly. The exemplary embodiment utilizes a rapid engaging, positive locking machine screw 600 in combination with a threaded eyeglass frame member 650 for fastening an eyeglass arm to an eyeglass main frame. Similarly the rapid engaging/positive locking thread configuration can be used to secure a lens within the eyeglass main frame. The rapid engaging, positive locking machine screw 600 includes a threaded portion 614 comprising the male portion of the rapid engaging/positive locking thread configuration as previously taught. The threaded eyeglass frame member 650 is formed including a frame assembly hinge upper portion 680 and a frame assembly hinge lower portion 684, forming a frame receptacle 682 therebetween for receiving a mating frame member. The threaded eyeglass frame member 650 comprises the female portion of the rapid engaging/positive locking thread configuration as previously taught. The female portion can be provided through at least one of the frame assembly hinge upper portion 680 and the frame assembly hinge lower portion 684. Like features of rapid engaging, positive locking machine screw 600 and machine screw 110 and similarly the threaded eyeglass frame member 650 and threaded eyeglass frame member 650 are numbered the same except preceded by the numeral '6'. The rapid engaging, positive locking machine screw 600 is inserted into the opening 660 and secured by rotated up to just under ½ of a rotation. It is understood that any of the additional locking features, such as the bosses 270 and depressions 272 or locking tab 340 and respective locking groove 342 as previously taught can be integrated into the configuration for the rapid engaging, positive locking machine screw 600 and threaded eyeglass frame member 650.

Figure 16:
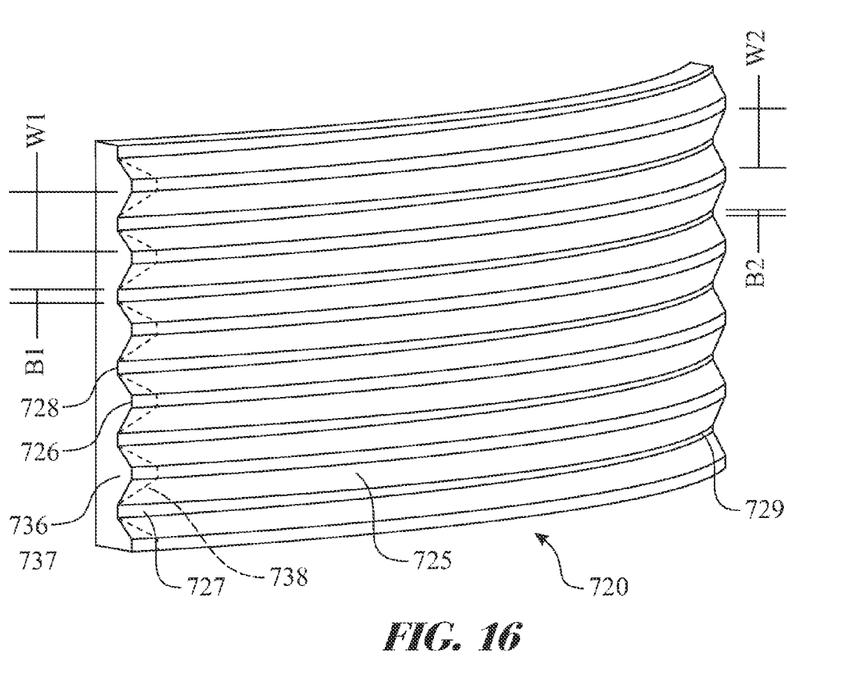
FIG. 16 is an isometric view of an exemplary thread configuration detailing an interference fit form factor.
Figure 17:
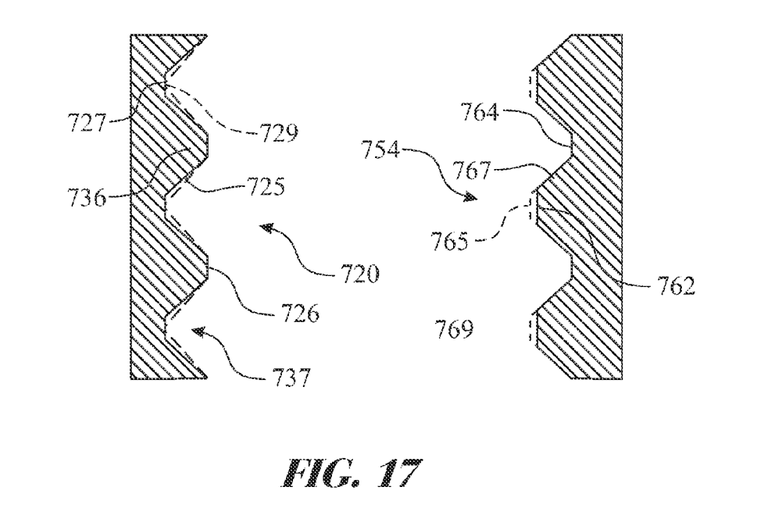
FIG. 17 is cross-sectional view of mating threads of the exemplary thread configuration of FIG. 16 detailing respective dimensions.

Another thread locking interface can be provided via the thread dimensions as illustrated in FIG. 16 and sectional side view of FIG. 17. The male threads 720 are formed having a varying thread dimension along the length of the thread segment. This arrangement is unique and can be formed and utilized as the thread segments are not continuous about the length of the threaded portion of the fastener. The threads are formed having a male thread crest 726, a male thread root 728 and a male thread sidewall 725 formed therebetween. The void created is referred to as a thread mouth 737. The exposed end of each thread is defined as a thread cross sectional face 736. The thread cross sectional face 736 can be perpendicular to the threads illustrated by the solid lines or angled providing a thread lead in 738 as illustrated by the broken lines. A portion of each thread segment, such as the male thread root 728 (as shown) or the male thread crest 726 (as understood from the description of the male thread root 728 can vary along the length of the segment. The male thread root 728 would initiate having a width defined as a thread wide root portion 727, tapering to a thread narrow root portion 729. Alternately, a similar tapering can be provided along the segment length of the male thread crest 726.

The female threads 754 can be similarly formed having a varying thread dimensions along the length of the thread segment. The female threads 754 are formed having a female thread crest 762, a female thread root 764, and a female thread sidewall 767 formed therebetween. The void created is referred to as a female thread mouth 769. The female thread crests 762 can vary in position modifying the depth of the female thread mouth 769 extending at one end to a female thread crest 765.

When initially engaging, the thread cross sectional face 736 is inserted into the female thread mouth 769. The optional thread lead in 738 can be provided to aid in the alignment of the thread cross sectional face 736 and the female thread mouth 769. As a torque is applied to threading interface the varying width of the male threads 720 creates an interference with the female thread sidewall 767 of the female threads 754. Concurrently, the varying height of the female thread crests 762 creates an interference with the male thread root 728. Additionally, the varying sidewall orientation gradually increases in frictional interference between the male thread sidewall 725 and the female thread sidewall 767. These interference features can be used jointly, in combination, as well as being formed in a reversed configuration. The threads can be formed via a non-concentric thread-forming machine.

In the foregoing description those skilled in the art will readily appreciate that modifications may be made to the invention without departing from the concepts disclosed herein. Such modifications are to be considered as included in the following claims, unless these claims expressly state otherwise.

The invention claimed is:

1. A rapid engaging locking screw interface comprising:
a threaded fastening member having a male threaded section comprising a threaded body having at least one longitudinal segment devoid of threads and wherein said male threads generally cover one-half of a total surface of said body;
a mating threaded fastening member having a female threaded section comprising a hole having female threads formed on a surface defined therein for receiving said screw, said threaded hole further defining at least one longitudinally extending segment devoid of said female threads and wherein said female threads generally cover one-half of a total of said surface; wherein:
a first threaded member end surface provided at an end of said threaded fastening member and a second threaded member end surface provided on an end of said mating threaded fastening member, wherein said first threaded member end surface engages with said second threaded member end surface when said threaded fastening member is fully engaged with said mating threaded fastening member;
said longitudinal screw segment devoid of male threads and said longitudinal hole segment devoid of female threads are arranged such that said screw body is longitudinally received in said hole without engagement of said male threads with said female threads;
multiple ones of said male screw threads and multiple ones of said female threads engage one with said other substantially simultaneously upon rotation of said screw with respect to said mating threaded fastening member;
said screw resulting in maximum engagement of said male threads in said female threads via a maximum of one-haft of a rotation;
a locking feature comprising a locking ridge disposed at a first location upon said end surface of one of said threaded members; and
a mating locking recess formed at a second location within said end surface of said other threaded member;
wherein said male thread section is inserted axially into said longitudinally extending segment devoid of said female threads, stopping at a maximum insertion depth then rotated where said locking feature and said locking recess are located to engage with one another to limit said rotation of said thread sections to a maximum of one-half of a rotation respective to one another ensuring the male threads remain engaged with the female threads.

2. A rapid engaging locking screw interface as recited in claim 1, further comprising a threaded fastener comprising a head and a screw body and a mating threaded fastener,
said male threaded section being formed upon said screw body;
said female threaded section being formed within said mating threaded fastener.

3. A rapid engaging locking screw interface as recited in claim 2, further comprising at least one locking ridge located on a bottom surface of said head and at least one locking recess located on a surface of said mating threaded fastener which contacts said bottom surface of said head.

4. A rapid engaging locking screw interface as recited in claim 2, further comprising at least one locking recess located on a bottom surface of said head and at least one locking ridge located on a surface of said mating threaded fastener which contacts said bottom surface of said head.

5. A rapid engaging locking screw interface as recited in claim 1, further comprising a bottle and a bottle cap,
said male threaded section being formed upon a neck of said bottle;
said female threaded section being formed within said bottle cap.

6. A rapid engaging locking screw interface as recited in claim 1, further comprising a first pipe section and a second pipe section,
said male threaded section being formed upon a first end of said first pipe section;
said female threaded section being formed within a fastening member coupled to said second pipe section.

7. A rapid engaging locking screw interface as recited in claim 1, further comprising a threaded fastener and a eyeglass frame member,
said male threaded section being formed upon said threaded fastener;
said female threaded section being formed within said eyeglass frame member.

* * * * *